UNITED STATES PATENT OFFICE.

BENJAMIN PEACOCK, OF PHILADELPHIA, PENNSYLVANIA, ASSIGNOR, BY MESNE ASSIGNMENTS, TO INTERNATIONAL AGRICULTURAL CORPORATION, OF NEW YORK, N. Y., A CORPORATION OF NEW YORK.

PROCESS OF PRODUCING POTASSIUM HYDROGEN PHOSPHATE.

1,046,327.     Specification of Letters Patent.     Patented Dec. 3, 1912.

No Drawing.     Application filed April 17, 1912. Serial No. 691,509.

*To all whom it may concern:*

Be it known that I, BENJAMIN PEACOCK, a citizen of the United States, residing at Philadelphia, in the county of Philadelphia and State of Pennsylvania, have invented certain new and useful Improvements in Processes of Producing Potassium Hydrogen Phosphate; and I do hereby declare the following to be a full, clear, and exact description of the invention, such as will enable others skilled in the art to which it appertains to make and use the same.

This invention relates to a process for producing potassium hydrogen phosphate $K_2HPO_4$ from natural phosphate rock, and potash silicates, such as feldspar, leucite, etc., and has for its object to provide a process which will be simple, comparatively inexpensive, and expeditious in practice.

With these and other objects in view, the invention consists in the novel steps constituting my process as will be more fully hereinafter disclosed and particularly pointed out in the claims.

In carrying out my invention, I reduce the feldspar or leucite and the phosphate rock to a fine state of sub-division, and mix them in such proportions that the calcium oxid in the phosphate rock and the silica and aluminum oxid in the feldspar will be present in the mixture in chemically equivalent proportions, so that calcium and aluminum silicates will be formed.

For example, I may take 600 pounds of phosphate rock which, under average circumstances, will contain:—

| | |
|---|---|
| $CaO$ | 306 lbs. |
| $SiO_2$ | 36 " |
| $Al_2O_3$ | 12 " |
| $FeO$ | 6 " |
| $P_2O_5$ | 192 " |
| $CO_2$, etc. | 48 " |

And I may take 2,000 pounds of leucite which an average analysis shows will contain:—

| | |
|---|---|
| $SiO_2$ | 1,074 lbs. |
| $Al_2O_3$ | 223 " |
| $K_2O$ | 223 " |
| $Na_2O$ | 33 " |
| $MgO$ | 129 " |
| $CaO$ | 69 " |
| $CO_2$, etc. | 249 " |

I then suitably crush and finely subdivide these raw materials and mix 600 pounds of the phosphate rock material with 2,000 pounds of the leucite material so as to provide full chemical equivalents of $Al_2O_3$, $FeO$, $CaO$ and $MgO$ for all the $SiO_2$ present. The mixture then contains 375 pounds of $CaO$, 235 lbs. $Al_2O_3$, 129 lbs. $MgO$, and 6 lbs. $FeO$, making 735 lbs. of basic oxids to 1110 pounds of silica. It also contains 192 pounds of phosphoric anhydrid to 223 pounds of potassium oxid. I next heat this mixture to substantially 1500° C. to effect a complete sintering or fusion of the materials, to decompose the silicates of the leucite, and to form silicates with the lime, alumina, magnesium oxid and iron oxid, in accordance with the following equations:—

(1)   $CaO + SiO_2 = CaSiO_3$ (2)   $MgO + SiO_2 = MgSiO_3$ (3)   $FeO + SiO_2 = FeSiO_3$ (4)   $Al_2O_3 + SiO_2 = Al_2SiO_5$

In the meantime the potassium oxid contained in the feldspar or leucite unites with the phosphoric anhydrid in the phosphate rock to form pyro potassium phosphate, in accordance with the following equation:—

$$2K_2O + P_2O_5 = K_4P_2O_7$$

After the above combinations have been formed in the furnace, the red hot materials are discharged therefrom and quenched with water which aids in rendering the potassium phosphate soluble in that medium during later operations. The cinder is next crushed to say 100 mesh and delivered to a digester of any suitable type such for example, as those employed in the manufacture of sulfite pulp.

The finely divided cinder is next mixed with water to the consistency of a thin mud, and subjected to superheated steam at a pressure above that of the atmosphere, and at a temperature above 130° C. until substantially all the potassium phosphate is converted into potassium hydrogen phosphate $K_2HPO_4$, which is soluble in water. The contents of the digester are next filtered and washed. The filtrate is next suitably concentrated and the potassium hydrogen phosphate $K_2HPO_4$ separated out as crystals.

It is obvious that those skilled in the art may vary the details of my process without departing from the spirit thereof, and therefore, I do not wish to be limited to the above disclosure except as may be required by the claims.

What I claim is:—

1. The process of producing a potassium hydrogen phosphate which consists in mixing in a finely divided condition phosphate rock with a mineral containing an oxid of potassium in suitable chemical proportions for said oxid to unite with the phosphorus in said rock to form a potassium phosphate and for the other constituents of said minerals to unite to form silicates; heating said mixture to substantially 1500° C. to cause the formation of said compounds; quenching said mixture with water to render the potassium phosphate more easily soluble in the later operations; treating the quenched materials with steam at a pressure above the atmosphere to form potassium hydrogen phosphate and suitably dissolving out and recovering said latter phosphate, substantially as described.

2. The process of producing potassium hydrogen phosphate from phosphate rock and a mineral containing potassium oxid which consists in suitably mixing and proportioning said minerals to permit the formation of potassium pyro-phosphate $K_4P_2O_7$, and a plurality of silicates; heating said mixture until a mixture of said silicates and said pyro-phosphate is formed; and converting said pyro-phosphate into potassium hydrogen phosphate, substantially as described.

In testimony whereof, I affix my signature, in presence of two witnesses.

BENJAMIN PEACOCK.

Witnesses:
I. C. MINFORD,
L. MILTON MOHR.